United States Patent [19]

Castro et al.

[11] 4,387,272

[45] Jun. 7, 1983

[54] METHOD AND APPARATUS FOR CONTROLLING A SUBSCRIBER PHONE SYSTEM INCLUDING AT LEAST ONE AUTOMATIC PHONE-ANSWERING MACHINE

[76] Inventors: Marcelo Castro; Horacio Castro, both of Carlos Pellegrini 885, Buenos Aires, Argentina

[21] Appl. No.: 288,812

[22] Filed: Jul. 31, 1981

[51] Int. Cl.$^3$ ............................................. H04M 1/65
[52] U.S. Cl. .................................. 179/6.11; 179/6.03; 179/6.07; 179/6.16
[58] Field of Search .................... 179/6.07, 6.11, 6.13, 179/6.15, 6.16, 84 C, 89, 6.03

[56] References Cited

U.S. PATENT DOCUMENTS 3,784,721  1/1974  Kilby .................................. 179/6.07
3,793,487  2/1974  Kilby .................................. 179/6.07

Primary Examiner—Raymond F. Cardillo, Jr.
Attorney, Agent, or Firm—Fleit, Jacobson & Cohn

[57] ABSTRACT

A method and apparatus is provided for controlling a subscriber phone system including at least one automatic phone answering machine. When a calling party dials the phone number of a subscriber he wants to call, the apparatus will close the direct current loop, in response to which the calling party receives a ring-back signal. If he does not send a pre-established code after having received the ring-back signal, and after a predetermined period of time has elapsed, the phone line will be automatically connected to an automatic phone-answering machine. But if he dials a pre-established code after the closing of the direct current loop, the code will be displayed on a display device and at the same time an acoustic signal source will be activated, warning the called party that he is receiving a call from somebody who knows the pre-established code. Looking at the display device, the called party is able to know the code and may or may not want to attend the call. If he does attend the call, the automatic phone-answering machine will not be connected to the phone line; instead, the phone set of the subscriber will be, allowing him to answer the call in a normal way. If he does not attend the call or is not able to do so, for example because he is absent from the place, then, after a certain period of time has elapsed, the automatic phone-answering machine will be connected to the phone line.

6 Claims, 2 Drawing Figures

METHOD AND APPARATUS FOR CONTROLLING A SUBSCRIBER PHONE SYSTEM INCLUDING AT LEAST ONE AUTOMATIC PHONE-ANSWERING MACHINE

BACKGROUND OF THE INVENTION

1. Field of the Invention

This invention pertains to the telephonic art and more particularly to the use of automatic phone-answering machines controllable through pre-established codes.

2. Description of the Prior Art

The automatic phone-answering machine is a device well known in the telephonic art. However, the known machines are all designed to answer automatically any call which is received on the phone line to which they are connected. The phone subscriber may or may not connect the machine to the phone line. But when he is present at the place and he has the machine connected to the phone line, he is not able to know whether a call is being received or can he know whether the calling party is or is not a desirable one. All the calls will be automatically attended by the machine. And, if he has the machine disconnected, then all the calls will activate the ringing bell of his phone set. Thus, it would be highly desirable to have a system by means of which it would be possible to know if the calling party is or is not a desirable one. Then, if the called party desires to attend the call, he would be able to do so, and, if he does not want to attend it, then the automatic phone-answering machine would be automatically connected to the phone line. The same action would take place if he does not attend the call because he is absent from the place.

SUMMARY OF THE INVENTION

The invention relates to a phone system which includes an automatic phone answering machine. However, the answering machine is not related in the common way to the input terminals of the phone line. The phone subscriber may give, to certain parties, one or more special code numbers. A calling party who has received from the subscriber such a code number, and desires to establish communication with him, first of all dials the conventional phone number corresponding to the called party. When the apparatus of this invention receives the ringing signal, it will automatically attend the line, closing the direct current loop and sending to the calling party a ring-back signal. After the calling party has received the ring-back signal, he dials the code number, which is decoded by the apparatus and, if the decoded signal corresponds to one of the pre-established codes, it will advise the called party by sounding an audible warning signal indicating that a call has been received and, at the same time, it will display, on a display device, the code number sent by the calling party. Thus, the called party may know who is calling him. If he wants to attend the call, he unhooks the handset of his phone set, connecting it to the line, and this action activates a relay which disconnects the entire electronic system from the line, after which he may establish a conventional communication. If he does not want to attend the call, he takes no step whatsoever. After a predetermined period of time has elapsed, the apparatus activates automatically the phone-answering machine and connects it to the phone line and the calling party will be so advised by the machine and this latter may record a desired message. The same thing happens if the call is not answered by the subscriber because he is absent from the place.

If the code sent by the calling party is not one of the pre-established codes, or if the calling party sends no code at all, and after a certain period of time has elapsed, the answering machine will also be connected to the phone line and the apparatus will not emit the audible warning signal nor will display any code on the display device.

If the subscriber wants to be able to receive any kind of calls in the conventional manner, he may actuate a switch which inactivates the apparatus, including the answering machine, and, thereafter, he may connect his phone set directly to the phone line.

According to a more sophisticated embodiment of this invention, the same principles may be applied to the use of two answering machines, one of which is able to attend certain special desired calls corresponding to one or more special codes, and the other being able to attend calls in general, corresponding to other less preferential codes or calls which are not accompanied by a code at all.

According to a still more sophisticated embodiment of this invention, the same principles may be applied to the use of more than two answering machines, for example three, of which, at least, one will attend the calls which are not accompanied by a code, a second one may attend calls followed by a code corresponding, for example, to familiar calls, and a third one will attend calls followed by a code corresponding, for example, to business calls.

According to a first method aspect of the present invention, the method comprises the steps of:

(A) sending from the calling end of a phone line the characters corresponding to the phone number of the subscriber whom the calling party wants to call; (B) detecting at the called end of the phone line the presence of the ringing signal alternating current emitted by the exchange in response to the call established therethrough; (C) automatically electrically closing, at the called end, the direct current loop by connecting to the phone line an electric impedance element substantially equivalent to the impedance offered to the phone line by a conventional phone set the receiver of which has been unhooked; (D) in response to the closing of the direct current loop, sending automatically a confirmation tone from the called apparatus to the calling party; (E) after the closing of the direct current loop, and if no code or an incomplete code—that is to say a code consisting of less characters than those for which the apparatus is prepared—has been received from the calling party within said predetermined period of time, activating at the called end an automatic phone-answering machine and connecting it to the phone line, and, if a code has been received from the calling party within said predetermined period of time, emitting an audible warning signal, if the received code is a pre-established one, and displaying any complete received code at the called end without yet connecting the answering machine; (F) if, after a second predetermined period of time has elapsed, the called party has not attended the call, activating automatically the answering machine and connecting it to the phone line; and (G) when another predetermined period of time has elapsed, the called party having not answered the call, opening automatically the direct current loop of the phone line.

According to a second method aspect of this invention, the method comprises the steps of: (A) sending from the calling end of a phone line the characters corresponding to the phone number of the subscriber whom the calling party wants to call; (B) detecting at the called end of the phone line the presence of the ringing signal alternating current emitted by the exchange in response to the call established therethrough; (C) automatically electrically closing, at the called end, the direct current loop by connecting to the phone line an electric impedance element substantially equivalent to the impedance offered to the phone line by a conventional phone set the receiver of which has been unhooked; (D) in response to the closing of the direct current loop, sending automatically a confirmation tone from the called apparatus to the calling party; (E) after the closing of the direct current loop, and if no code or an incomplete code has been received from the calling party within a predetermined period of time, activating at the called end a first automatic phone-answering machine and connecting it to the phone line, and, if a code has been received from the calling party within said predetermined period of time, emitting an audible warning signal, if the received code is a pre-established one, and displaying any complete received code at the called end without yet connecting any answering machine; (F) if, when a second predetermined period of time has elapsed, the called party has not attended the call, activating automatically a second answering machine and connecting it to the phone line in response to the received pre-established code; and (G) when another predetermined period of time has elapsed, the called party having not answered the call, opening automatically the direct current loop of the phone line.

According to a third method aspect of this invention, the method comprises the steps of: (A) sending from the calling end of a phone line the characters corresponding to the phone number of the subscriber whom the calling party wants to call; (B) detecting at the called end of the phone line the presence of the ringing signal alternating current emitted by the exchange in response to the call established therethrough; (C) automatically electrically closing, at the called end, the direct current loop by connecting to the phone line an electric impedance element substantially equivalent to the impedance offered to the phone line by a conventional phone set the receiver of which has been unhooked; (D) in response to the closing of the direct current loop, sending automatically a confirmation tone from the called apparatus to the calling party; (E) after the closing of the direct current loop, and if no code or an incomplete code has been received from the calling party within a predetermined period of time, activating at the called end a first automatic phone-answering machine and connecting it to the phone line, and, if a code has been received from the calling party within said predetermined period of time, emitting an audible warning signal, if the received code is a pre-established one, and displaying any complete received code at the called end without yet connecting any answering machine; (F) if, after a second predetermined period of time has elapsed, the called party has not attended the call, activating automatically one of a plurality of other answering machines and connecting it to the phone line, according to the pre-established code which has been received, and (G) when another predetermined period of time has elapsed, the called party having not answered the call, opening automatically the direct current loop of the phone line.

According to a first apparatus aspect of this invention, the apparatus comprises: means for detecting the presence of a ringing signal corresponding to a call at the phone line to which the apparatus is connected; means for connecting to the phone line, in the presence of the ringing signal, an electric impedance element substantially equivalent to the impedance offered to the phone line by a conventional phone set the receiver of which has been unhooked, thus closing the direct current loop; means for sending automatically a confirmation tone from the called apparatus to the calling party in response to the closing of the direct current loop; means for detecting the reception through the phone line of a pre-established code and presenting at its output a validation signal in response to the reception of said code, means capable of activating an automatic phone-answering machine and connecting it to the phone line in the absence of such a validation signal, means capable of activating a device generating an audible warning signal and of activating code display means displaying the received code; means capable of activating said answering machine and connecting it to the phone line when a predetermined period of time has elapsed during which the call has not been attended; and means for disconnecting the apparatus from the phone line when another predetermined period of time has elapsed after the connection of the answering machine and if the called party has not attended the call, and for opening the direct current loop of the phone line.

According to a second apparatus aspect of this invention, the apparatus comprises: means for detecting the presence of a ringing signal corresponding to a call at the phone line to which the apparatus is connected; means for connecting to the phone line, in the presence of the ringing signal, an electric impedance element substantially equivalent to the impedance offered to the phone line by a conventional phone set the receiver of which has been unhooked, thus closing the direct current loop; means for sending automatically a confirmation tone from the called apparatus to the calling party in response to the closing of the direct current loop; means for detecting the reception through the phone line of a pre-established code and presenting at its output a validation signal in response to the reception of said code; means capable of activating a first automatic phone answering machine and connecting it to the phone line in the absence of such a validation signal; means capable of activating a device generating an audible warning signal and of activating code display means displaying the received code; means capable of activating a second answering machine and connecting it to the phone line when a predetermined period of time has elapsed during which a validation signal has been produced but the phone set has not been attended; and means for disconnecting the apparatus from the phone line when another predetermined period of time has elapsed after the connection of any of said answering machines and if the called party has not attended the call, and for opening the direct current loop of the phone line.

According to a third apparatus aspect of this invention, the apparatus comprises: means for detecting the presence of a ringing signal corresponding to a call at the phone line to which the apparatus is connected; means for connecting to the phone line, in the presence of the ringing signal, an electric impedance element substantially equivalent to the impedance offered to the phone line by a conventional phone set the receiver of which has been unhooked, thus closing the direct current loop, means for sending automatically a confirmation tone from the called apparatus to the calling party in response to the closing of the direct current loop; means for detecting the reception through the phone line of a pre-established code and presenting at its output a validation signal in response to the reception of said code; means capable of activating a first automatic phone-answering machine and connecting it to the phone line in the absence of such a validation signal; means capable of activating a device generating an audible warning signal and of activating code display means displaying the received code; means capable of activating, according to the received code, a predetermined one of a plurality of other answering machines and connecting it to the phone line when a predetermined period of time has elapsed during which a validation signal has been produced but the phone set has not been attended; and means for disconnecting the apparatus from the phone line when another predetermined period of time has elapsed after the connection of any of said answering machines and if the called party has not attended the call, and for opening the direct current loop of the phone line.

The invention will be better understood through the following description of a presently preferred embodiment thereof, which will be given with reference to the accompanying drawings.

DETAILED DESCRIPTION OF THE PREFERRED EMBODIMENT

Figure 1:
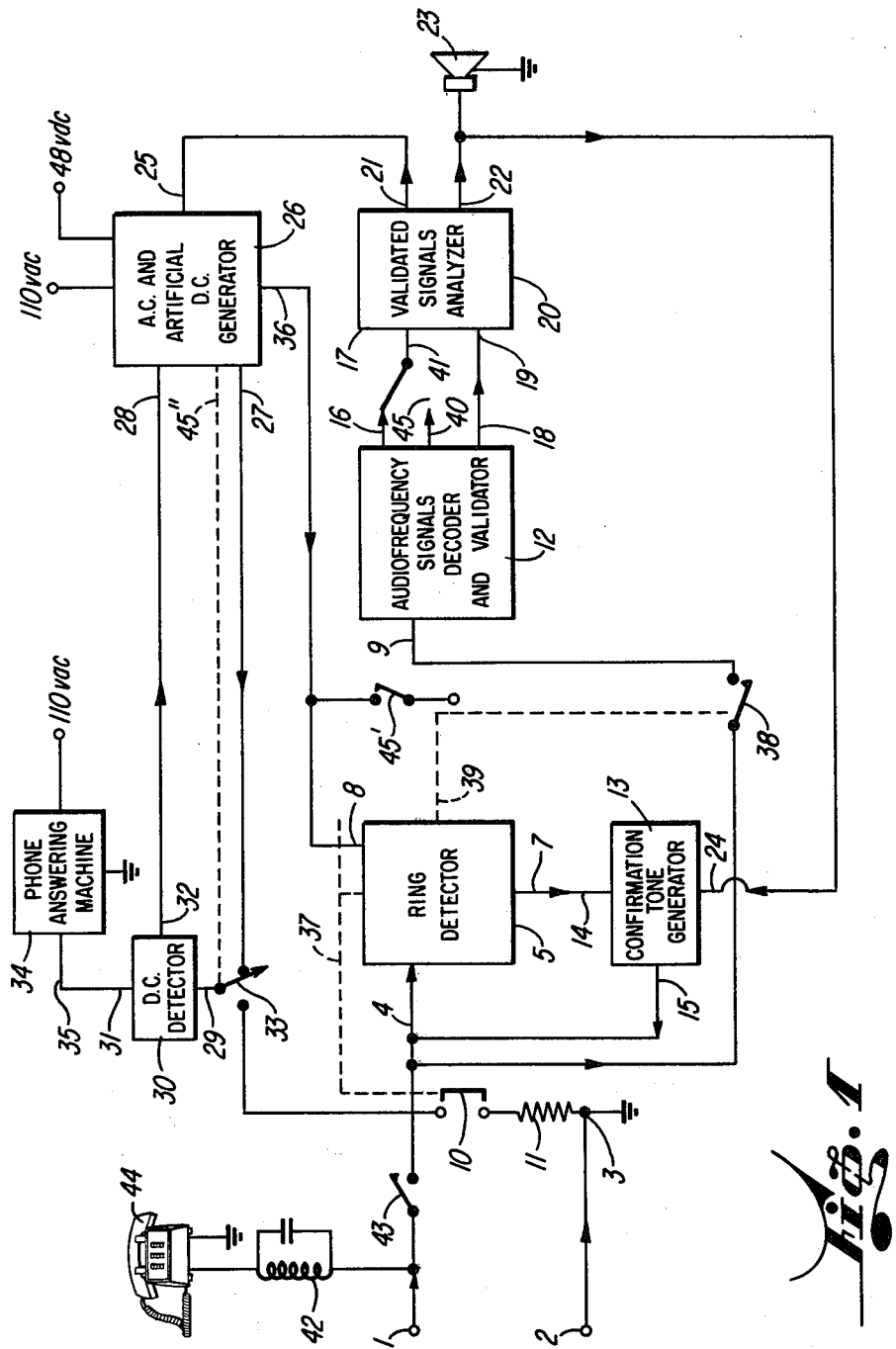
FIG. 1 is a block diagram illustrating the essential principles of the invention, allowing to better explain both the method and the apparatus aspects thereof.

In FIG. 1 it can be seen that the apparatus of the present invention comprises two input terminals 1 and 2 which will be connected to the phone line. Terminal 2 may be connected to the common ground of the circuit but it must be isolated from earth. The ringing alternating signal coming from the exchange goes into input 4 of call detector 5; this latter can receive one or more trains of ringing pulses (adjustable) and, therefrom, through its output 37, activates a relay, the normally open contact 10 of which connects in parallel with the phone line a resistor 11 the value of which equals the impedance offered by a phone set having its handset unhooked. Call detector 5, through its output 7, produces a pulse the duration of which may be, for example, 1 second. Said pulse goes into input 14 of confirmation tone generator 13 which may be, for example, 1050 Hz. In its turn, through its output 15, generator 13 sends the confirmation signal to input 1 of the phone line, said signal being intended to alert the calling party that he has been attended by the apparatus. Next, with a delay of about 0.5 seconds, detector 5 activates, through its output 39, a relay, the normally open contact 38 which connects the phone line to input 9 of code decoder and validator 12. This latter is arranged in such a way that it allows the admission of, at least, one validated and preselected code or the reception of recognizable signals constituting a code of so many characters as those for which the apparatus has been prepared. Through input 9 of decoder 12, the signals sent by the calling party's phone set, through the phone line, are received. In case the calling phone set generates a character or characters validated by 12, this latter offers a positive logic output on its output terminals 16 and 18. These outputs are coupled to terminals 41 (through the validated or completed codes switch 45) and 19, corresponding to code signal analyzer 20. This latter has an output 22 activating intermittently piezoelectric buzzer 23 intended to advise the called party that there is an incoming phone communication with validated code. Said logic signal goes into input 24 of confirmation tone generator 13, which connects to the phone line the preceding signal, intended to advise the calling party that the sent code has been accepted by the apparatus, simulating an artificial ring-back. From that moment, there are two possibilities: (a) If the called party answers phone 44, on unhooking the handset, relay 42 will be activated, disconnecting, through its normally closed contact 43, the apparatus from the phone line, and, through its normally open contact 45', resetting the system. If the called party does not answer the phone call, analyzer 20, through its output 21, activates, after a time period of, for example, 30 seconds, input 25 of the call activating circuit of automatic phone-answering machine 34. This latter, through its output 45'', activates a relay, which, through its change contact 33, allows the passage of ringing signals from output 27 to the automatic phone-answering machine 34 through detecting means 30. The ringing signals are constituted by alternating and direct current similar to those of a conventional phone call. As soon as detector 30 detects the passage of direct current through answering machine 34, it sends, through its output 32, a blocking signal entering input 28 of artificial ringing means 26, interrupting the ringing signals, thus producing the activation and change of relay 33 and the connection of the answering machine to the input of the phone line. At the same time, artificial ringing means 26, through its output 36, sends a disconnection signal to input 8 of detector 5, producing the release of the apparatus from the incoming phone line. The automatic phone-answering machine will continue to work by itself; therefore, once its normal cycle is finished, it will be disconnected from the phone line. Once this has taken place, sensor 30 detects said condition, sending through its output 32, a signal that, applied to input 28 of artificial ringing means 26, goes back, through its output 45'', to relay 33, connecting it in its normal position. (b) If the phone set operated by the calling party does not send a code or sends a code which is not a pre-established one, decoding means 12 will offer at its output a logic signal contrary to that of the previous case, which, on entering input 17 of analyzing means 20, activates a delay of, for example, 5 seconds, which, on finishing its cycle, activates only output 21 being coupled to input 25 of artificial ringing means 26, the process taking place in the same way as explained for the case of signals being received with a validated code. Another possibility of activating the apparatus of this invention is offered if the calling party sends a complete code with so many characters as those for which the apparatus has been programmed. In this case, analyzing circuit 20 responds in the same manner as if a validated code had been received, provided switch 45 is connected between 40 and 41. When switch 45 is in position 40 the apparatus will consider as a validated code any code having the same number of characters as those for which it is programmed and will consider as false the conditions of non-reception of code or the reception of a code with less characters than those for which it is programmed. The diagram shows phone set 44 as included in the apparatus of the present invention. If the called party decides to answer directly the phone call at any stage of the process performed by the apparatus, on lifting the handset, relay 42 will be activated, disconnecting through the normally closed contact 43 the phone line from the apparatus, thus resetting this latter through the normally open contact 45'.

Figure 2:
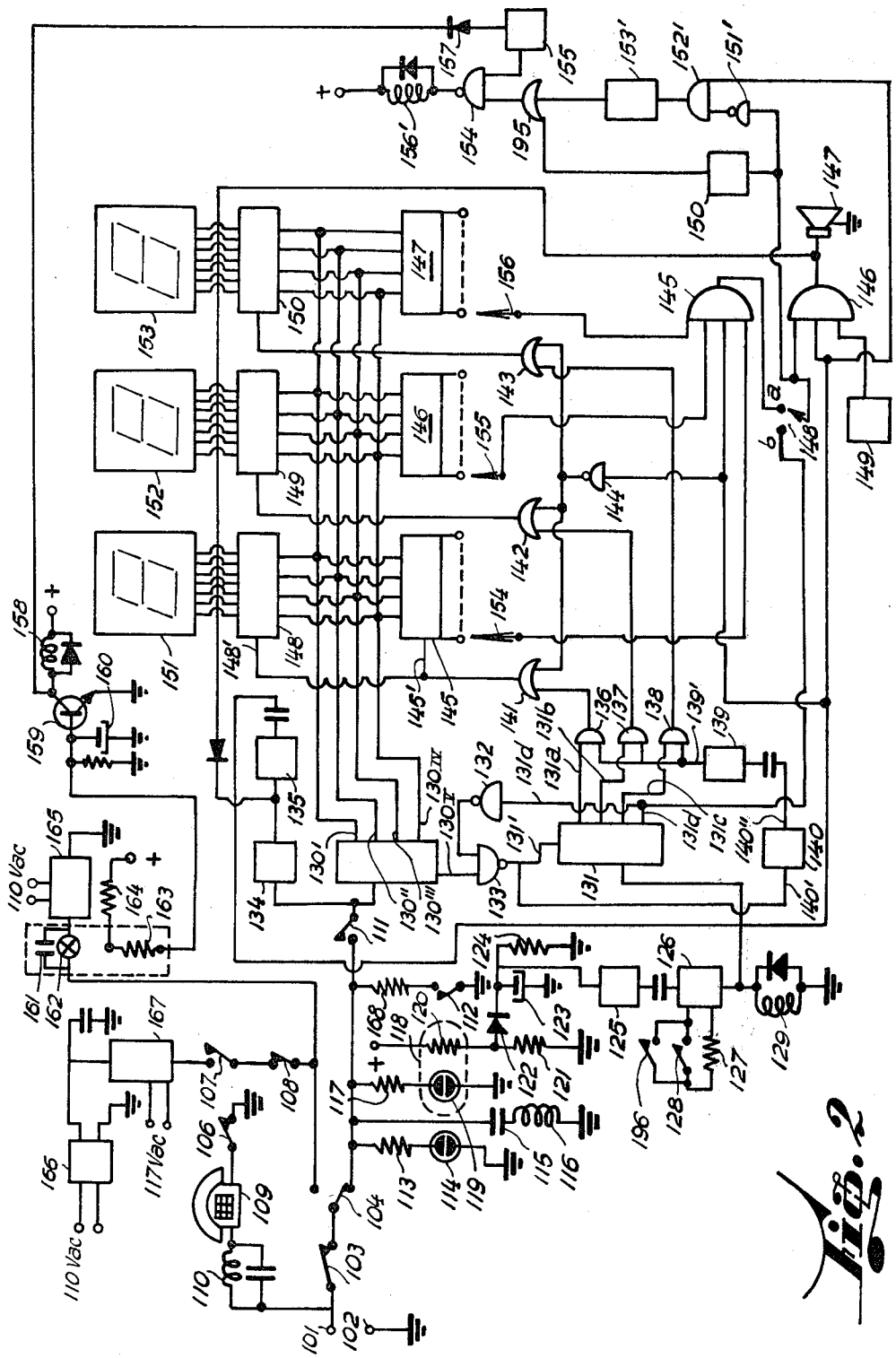
FIG. 2 is a schematic circuit diagram, partially in block form, illustrating the detailed circuit of the preferred embodiment.

FIG. 2 shows in detail the circuit of the preferred embodiment. The phone line is connected to terminals 101 and 102 of the apparatus. Terminal 102 may be connected to a common ground but it must be isolated from earth of the equipment. The alternating ringing signal coming from the exchange enters through normally closed contact 103 of relay 110 (which remains in this state when the handset of phone set 109 is on hook), passes through change contact 104 of relay 158 (normally inactivated) and activates optocoupler 118 constituted by a neon lamp 119 and a photoresistor 120. The voltage potential at the junction point of photoresistor 120 and bias resistor 121 is applied to delaying means constituted by capacitor 123 and resistor 124 with the aim of storing, for example, two trains of ringing signals. This information is coupled to the input of Schmitt trigger 125; this latter generates a voltage triggering monostable 126. Said monostable has a time constant of, for example, 50 seconds, and its output activates a relay 129, at the same time enabling counter 131, AND gates 145 and 146 and, also, unblocking memories 145, 146 and 147 through inverter 144 and OR gates 141, 142 and 143. At the same time, through the normally open contact 112 of relay 129, it connects to ground a resistor 168 having a value similar to the impedance of a phone set having its handset unhooked, thus making the exchange to stop sending the ringing signal while the phone communication takes place. The phone line is connected to decoder 130 through the normally open contact 111 of relay 129. At the same time, the output of monostable 126 triggers monostable 135; this latter energizes tone oscillator 134 during, for example, 1 second. This tone is applied to the phone line to the end of advising the calling party that he has been attended by the apparatus. If, from that moment, the calling party sends code signals, these latter will be decoded by "Touch-Tone" decoder 130, appearing, through its outputs 130' to 130'''', the binary information corresponding to the received character, that will be applied to the inputs of memories 145, 146 and 147 and to those of seven segments decoding memories 148, 149 and 150. Simultaneously with the appearance of the character through outputs 130' to 130'''', a high state will appear through 130''''', that, applied to NAND gate 133, together with the one received through inverter 132, will make a low state appear at clock input 131. At the same time monostable 140 receives that state through its input 140' and, through its output 140'' and after a delay of about 10 milliseconds, a low state will appear triggering monostable 139 that, through its output 139', will send a high state during, for example, 10 milliseconds, said high state enabling, during said time period, AND gates 136, 137 and 138. The counter 131 is of the decimal output type. As it was originally in zero position, there will be a high state on its output 131a, that, applied to 136 together with the high state received through 139', will make a high state appear through output 136, said high state passing through OR gate 141, enabled by inverter 144, and being applied to transference inputs of memories 145' and 148'. In such a way, the received character will remain stored in both memories, thus appearing on display 151 and being left activated the corresponding output 145'' of decimal output memory 145. When the calling party stops sending the character, any data output 130''''' will go to a low state, appearing a high state on 131', thus making 131 advance one step. If further characters are received, they will remain stored, in the described way, in 146 and 149 and in 147 and 150, being displayed the received code at displays 151, 152 and 153. After being received the third character through 131d, a high level will appear, that, inverted by 132, will block 133, preventing further characters from being memorized. From that moment, three possibilities may take place: (a) The calling party sends no code or sends an incomplete code. In this case, NAND gate 152 will receive a high state through both of its two inputs, thus applying a high level to the input of timer 153 of, for example, 5 seconds, the output of which, after said time period has elapsed, will offer a high state that, passing through OR gate 195, will enable one of the inputs of NAND gate 154. This latter, through its other input, receives an interrupted high state coming from the square wave generator 155, producing, at the output of 154, the appearance of a low state driving, in an alternating way, relay 156. This latter, through its normally open contact 107, sends to the input of the automatic phone-answering machine 165 a signal, consisting of alternating and direct currents, similar to those of a conventional phone call, being generated by the direct current source 166 and the alternating current source 167. When 165 "answers," a direct current will flow through lamp 162, producing the activation of the optocoupler formed by lamp 162 and a photoresistor 163, applying a positive voltage to the base of transistor 159 that, after a delay produced by capacitor 160, will drive relay 158 and, through diode 157, will inactivate generator 155. Relay 158, on one side, through its normally closed contact 108, disconnects the answering machine 165 from the aritificial ringing source and, through its inverter contact 104, connects the input of the phone line directly to the automatic phone-answering machine. In its turn, its normally open contact 196 connects a resistor 127 to monostable 126, making this latter finish rapidly its cycle and producing the general reset of the apparatus. On finishing its normal cycle, the automatic answering machine will be disconnected, making lamp 162 turn off, inactivating relay 158 and re-establishing the original connection of the system. (b) The calling party sends a complete code (consisting of so many characters as those wherefor the apparatus is prepared). Switch 148 is in position b. Once the code has been completed, through output 131d of the counting means 131, a high state will appear that will be applied, through 148, to one input of AND gate 146. Through other of its inputs, gate 146 receives a high state coming from monostable 126 and, through a third input, receives the intermittent high state coming from as table 149. Through the output of 146 an intermittent high state will appear, activating, on one side, piezoelectric buzzer 147 and, on the other side, confirmation tone generator 134, that advises the calling party that his code has been accepted. Simultaneously, through the input of timer 150, which is, for example, a 30 seconds timer, a high state will appear that, if phone set 109 is not attended by the the called party, will produce, after said time period of 30 seconds has elapsed, the appearance, at the output of timer 150, of a high state that will activate the phone-answering machine 165 in the same way as described in (a). If, instead, phone set 109 is attended, on passing current through relay 110, this latter will be activated and, through its normally closed contact 103, will disconnect the equipment from the phone line and, through its normally open contact 128, will make the monostable 126 go back to its stable position rapidly, thus resetting the whole apparatus. (c) The calling party sends a complete code and switch 148 is set at the a position. In such case there are two possibilities: (1) the received code is not the one selected through keys 154, 155 and 156. In this case, at the output of 145, a low state will appear, keeping 146 blocked. This same state will activate after five second the timer 153' through inverter 151' and AND gate 152', producing the activation of the automatic phone-answering machine 165 as described in (a). (2) The code coincides with the pre-selected one. In this case, 145 will receive at three of its inputs, a high state that, added to the one of monostable 126, will produce on its outputs the appearance of a high state that, on one side, activates AND gate 146 and produces the local acoustic signal through 147 and the return of the confirmation tone through 134. The high state present at 145 will activate timer 150, that, if within the time period of 30 seconds does not take place the answering of the phone set 109, will produce on the output a high state that will activate the answering machine 165 in the way described in (a).

While a specific embodiment of the apparatus, for putting the method and apparatus of the present invention into practice has been described in detail, the skilled in this art will easily understand that some changes and substitutions of components may be made therein which however will be comprised within the true spirit and scope of the invention as defined in the accompanying claims.

We claim:

1. A method for controlling a subscriber phone system connected to a telephone network which has a calling end and a called end, said subscriber phone system being connected to said called end and including an automatic phone-answering machine for recording messages, said method comprising the steps of:
   (A) transmitting from the calling end call signals identifying the subscriber;
   (B) detecting at the called end the presence of a ringing signal alternating current produced by the network in response to said call signals;
   (C) electrically closing, at the called end, a direct current loop by connecting to the network an electrical impedance element that is substantially equivalent to the impedance offered to the network by a conventional subscriber phone system which has been unhooked;
   (D) in response to the closing of the direct current loop, transmitting a confirmation signal from the called end to the calling end;
   (E) transmitting from the calling end to the called end at least one pre-established code signal associated with said subscriber phone system,
   (F) if after a predetermined time period from the closing of the direct current loop, an incomplete or undefined coded signal is received from the calling end, activating at the called end the automatic phone-answering machine and connecting it to the network, and, if a pre-established code signal has been received from the calling end within said predetermined period of time, registering said pre-established code signal and emitting an audible signal;
   (G) if, after a second predetermined period of time has elapsed, the subscriber phone system has not been attended, activating automatically the automatic phone-answering machine and connecting it to the network thereby to record messages, and when another predetermined period of time has elapsed, the called party having not answered the call, opening automatically the direct current loop of the network thereby to free the called end to receive subsequent calls.

2. A method for controlling a subscriber phone system connected to a telephone network which has a calling end and a called end, said subscriber phone system being connected to said called end and including two automatic phone-answering machines for recording messages, said method comprising the steps of:
   (A) transmitting from the calling end call signals identifying the subscriber;
   (B) detecting at the called end the presence of a ringing signal alternating current produced by the network in response to said call signals;
   (C) electrically closing, at the called end, a direct current loop by connecting to the network an electrical impedance element that is substantially equivalent to the impedance offered to the network by a conventional subscriber phone system which has been unhooked;
   (D) in response to the closing of the direct current loop, transmitting a confirmation signal from the called end to the calling end;
   (E) transmitting from the calling end to the called end at least one pre-established code signal associated with said subscriber phone system,
   (F) if after a predetermined time period from the closing of the direct current loop an incomplete or undefined code signal is received from the calling end, activating at the called end the first automatic phone-answering machine and connecting it to the network, and, if a pre-established code signal has been received from the calling end within said predetermined period of time, registering said pre-established code signal and emitting an audible warning signal;
   (G) if, when a second predetermined period of time has elapsed, the subscriber phone system has not been attended, activating automatically the second answering machine and connecting it to the network thereby to record messages therein in response to the received pre-established code; and
   (H) when another predetermined period of time has elapsed, the called party having not answered the call, opening automatically the direct current loop of the network.

3. A method for controlling a subscriber phone system connected to a telephone network which has a calling end and a called end, said subscriber phone system being connected to said called end and including a plurality of automatic phone-answering machines for recording messages, said method comprising the steps of:
   (A) transmitting from the calling end call signals identifying the subscriber;
   (B) detecting at the called end the presence of a ringing signal alternating current produced by the network in response to said call signals;

(C) electrically closing, at the called end, a direct current loop by connecting to the network an electrical impedance element that is substantially equivalent to the impedance offered to the network by a conventional subscriber phone system which has been unhooked;

(D) in response to the closing of the direct current loop, transmitting a confirmation signal from the called end to the calling end;

(E) transmitting from the calling end to the called end at least one pre-established code signal associated with said subscriber phone system, (F) if after a predetermined time period from the closing of the direct current loop, an incomplete or undefined code signal is received from the calling end, activating at the called end the automatic phone-answering machine and connecting it to the network, and, if a pre-established code signal has been received from the calling end within said predetermined period of time, registering said pre-established code signal and emitting an audible signal;

(G) if, after a second predetermined period of time has elapsed, the subscriber phone system has not been attended, activating automatically one of a plurality of other answering machines and connecting it to the network thereby to record messages on an answering machine that is selected according to the pre-established code signals which have been received; and (H) when another predetermined period of time has elapsed, the called party having not answered the call, opening automatically the direct current loop of the network.

4. An apparatus for controlling a subscriber phone system connected to a telephone network which has a calling end and a called end, said subscriber phone system being connected to said called end and including an automatic phone answering machine, comprising; means for detecting the presence of a ringing signal corresponding to a call at a phone line in the network to which the apparatus is connected; means for connecting to the phone line, in the presence of the ringing signal, an electrical impedance element substantially equivalent to the impedance offered to the phone line by a conventional subscriber phone system which has been unhooked, thus closing the direct current loop, means for sending automatically a confirmation signal from the called end to the calling end in response to the closing of the direct current loop; means for detecting the reception through the phone line of a pre-established code signal and generating at its output a validation signal in response to the reception and said pre-established code signal; means capable of activating said automatic phone answering machine and connecting it to the phone line in the absence of such a validation signal; means capable of activating a device generating an audible warning signal and of activating code display means displaying the received code signal; means capable of activating said answering machine and connecting it to the phone line when a predetermined period of time has elapsed during which the call has not been attended; means for disconnecting the apparatus from the phone line when another predetermined period of time has elapsed after the connection of the answering machine and if the call has not been attended, and for opening the direct current loop of the phone line.

5. An apparatus for controlling a subscriber phone system connected to a telephone network which has a calling end and a called end, said subscriber phone system being connected to said called end and including a plurality of automatic phone-answering machines, comprising; means for detecting the presence of a ringing signal corresponding to a call at the phone line to which the apparatus is connected; means for connecting to a phone line in the network, in the presence of the ringing signal, an electric impedance element substantially equivalent to the impedance offered to the phone line by a conventional subscriber phone system which has been unhooked, thus closing the direct current loop; means for sending automatically a confirmation signal from the called end to the calling end in response to the closing of the direct current loop; means for detecting the reception through the phone line of a pre-established code signal and generating at its output a validation signal in response to the reception of said pre-established code signal; means capable of activating a first automatic phone-machine and connecting it to the phone line in the absence of such a validation signal; means capable of activating a device generating an audible warning signal and of activating code display means displaying the received code signal; means capable of activating a second answering machine and connecting it to the phone line when a predetermined period of time has elapsed during which a validation signal has been produced but the subscriber phone system has not been attended; and means for disconnecting the apparatus from the phone line when another predetermined period of time has elapsed after the connection of any of said answering machines and if the call has not been attended, and for opening the direct current loop of the phone line.

6. An apparatus for controlling a subscriber phone system connected to a telephone network which has a calling end and a called end, said subscriber phone system being connected to said called end and including a plurality of automatic phone-answering machines, comprising: means for detecting the presence of a ringing signal corresponding to a call at a phone line in the network to which the apparatus is connected; means for connecting to the phone line, in the presence of the ringing signal, an electric impedance element substantially equivalent to the impedance offered to the phone line by a conventional subscriber phone system which has been unhooked, thus closing the direct current loop; means for sending automatically a confirmation signal from the called end to the calling end in response to the closing of the direct current loop; means for detecting the reception through the phone line of a pre-established code signal and generating at its output a validation signal in response to the reception of said pre-established code signal; means capable of activating a first automatic phone-answering machine and connecting it to the phone line in the absence of such a validation signal; means capable of activating a device generating an audible warning signal and of activating code display means displaying the received code signal; means capable of activating, according to the received code, a predetermined one of a plurality of other answering machines and connecting it to the phone line when a predetermined period of time has elapsed during which a validation signal has been produced but the subscriber phone system has not been attended; and means for disconnecting the apparatus from the phone line when another predetermined period of time has elapsed after the connection of any of said answering machines and if the call has not been attended, and for opening the direct current loop of the phone line.

* * * * *

UNITED STATES PATENT AND TRADEMARK OFFICE
CERTIFICATE OF CORRECTION

PATENT NO. : 4,387,272
DATED : June 7, 1983
INVENTOR(S) : Castro et al

It is certified that error appears in the above-identified patent and that said Letters Patent are hereby corrected as shown below:

Column 1, line 22, after "received", please delete "or" and insert --nor--.

Column 5, line 60, please delete "38" and insert --of--.

Column 8, line 18, please delete "153" and insert --153'--.

Column 8, line 58, please delete "as" and insert --a--.

Column 9, line 13, after "activate", please insert --,-- and please delete "second" and insert --seconds,--.

Signed and Sealed this

Eighth Day of May 1984

[SEAL]

Attest:

GERALD J. MOSSINGHOFF

*Attesting Officer*   *Commissioner of Patents and Trademarks*